US010826903B2

(12) United States Patent
Iimura et al.

(10) Patent No.: US 10,826,903 B2
(45) Date of Patent: Nov. 3, 2020

(54) AUTHENTICATION AND REGISTRATION SYSTEM

(71) Applicant: HONDA MOTOR CO., LTD., Tokyo (JP)

(72) Inventors: Takayuki Iimura, Raymond, OH (US); Yusuke Hamano, Tokyo (JP); Yozo Takehara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 16/165,141

(22) Filed: Oct. 19, 2018

(65) Prior Publication Data

US 2020/0128011 A1 Apr. 23, 2020

(51) Int. Cl.
| | |
|---|---|
| *G06F 7/04* | (2006.01) |
| *G06F 15/16* | (2006.01) |
| *H04L 29/06* | (2006.01) |
| *H04W 12/06* | (2009.01) |

(52) U.S. Cl.
CPC ......... *H04L 63/0876* (2013.01); *H04W 12/06* (2013.01)

(58) Field of Classification Search
CPC .............. H04L 63/0876; H04L 63/0853
See application file for complete search history.

(56) References Cited

U.S. PATENT DOCUMENTS

| | | | | |
|---|---|---|---|---|
| 9,736,656 | B1* | 8/2017 | Camacho | H04W 12/06 |
| 2013/0305323 | A1* | 11/2013 | Kleve | G06F 21/31 |
| | | | | 726/4 |
| 2014/0342701 | A1* | 11/2014 | Tateishi | H04W 4/44 |
| | | | | 455/411 |
| 2019/0149956 | A1* | 5/2019 | Chiang | H04W 60/00 |
| | | | | 701/36 |

FOREIGN PATENT DOCUMENTS

JP 2018-092323 6/2018

\* cited by examiner

*Primary Examiner* — Trong H Nguyen
(74) *Attorney, Agent, or Firm* — Rankin, Hill & Clark LLP

(57) ABSTRACT

An authentication and registration system is provided which can reduce a burden at the time of authentication and registration while ensuring security when a single apparatus is used to perform authentication and registration of identification information on another apparatus. In an authentication and registration system (1), an authentication request signal is transmitted from a mobile terminal (3) to a registration server (2). The registration server (2) transmits an operation command signal to the mobile terminal (3) and when the signal is received, a display (3*b*) of the mobile terminal (3) displays operation sub-commands. When the sub-commands are executed through operations of switches (10) to (20), an on-board controller (4) transmits an operating state signal indicating the execution to the registration server (2). When the operating state signal indicates that the sub-commands are executed, the registration server (2) determines that authentication of the identification information succeeds.

3 Claims, 7 Drawing Sheets

AUTHENTICATION AND REGISTRATION SYSTEM

BACKGROUND OF THE INVENTION

Field of the Invention

The present invention relates to an authentication and registration system which authenticates and registers identification information on a communication-capable apparatus.

Description of the Related Art

Conventionally, a system which registers and uses identification information on an apparatus as described in Japanese Patent Laid-Open No. 2018-92323 has been known. This system is to facilitate car sharing and includes a mobile terminal, a vehicle, a server, and the like. In this system, when a user makes a registration, identification information is registered by a business operator with the server and the mobile terminal. When the user uses the vehicle, the user operates the mobile terminal distributed by the business operator, whereby authentication processing is carried out between the mobile terminal and the vehicle, and the vehicle thus becomes able to be used.

In recent years, it has become common to provide telematics to users who purchase a vehicle, in which case it is necessary to authenticate identification information on the vehicle and register the identification information with a server and the like. In this case, unlike Japanese Patent Laid-Open No. 2018-92323, a user needs to perform an operation of authenticating and registering the identification information at a dealer. At the same time, an examination to check that the user owning a mobile terminal is the owner of the vehicle also needs to be strictly performed in order to ensure security at the time of authentication and registration. As a result, since burdens on the dealer and the user increase, an authentication and registration system which can reduce such burdens is desired. This problem does not only pertain to telematics, but similarly arises with services in which industrial equipment other than vehicles is remotely operated by using a communication-capable apparatus such as a mobile terminal.

The present invention is made in order to solve the above-described problem, and an object of the present invention is to provide an authentication and registration system which can reduce a burden at the time of authentication and registration while ensuring security when a single apparatus is used to perform authentication and registration of identification information on another apparatus.

SUMMARY OF THE INVENTION

In order to achieve the above-mentioned object, the present invention provides an authentication and registration system 1 comprising: a first apparatus (vehicle 6, on-board controller 4) which includes a first communication section (TCU 4b) configured to transmit and receive a data signal, with which identification information (vehicle identification information VIN, SIM identification information IMSI) is associated, and which performs an action through an operation by a first user, a second apparatus (mobile terminal 3) which includes a second communication section (wireless communication circuit 3c) configured to transmit and receive a data signal and an information output section (display 3c) configured to output information included in the data signal received by the second communication section, is provided separately from the first apparatus and can be operated in parallel with the first apparatus, and performs an action through an operation by a second user, and an authentication and registration apparatus (registration server 2) which includes a third communication section (wireless communication circuit 2c) configured to be able to perform data communication with the first communication section and with the second communication section via a network (wireless communication network 5), and an authentication and registration section (computation section 2a, storage section 2b) configured to register the identification information when a predetermined authentication condition of the identification information is satisfied, wherein by the second apparatus being operated, the second communication section transmits an authentication request signal for requesting authentication of the identification information on the first apparatus to the third communication section (STEP 5), when the third communication section receives the authentication request signal from the second communication section, the third communication section transmits, to the second communication section, an action instruction signal for providing an instruction to execute a predetermined action of the first apparatus (STEP 30), the information output section outputs information on the predetermined action when the second communication section receives the action instruction signal (STEP 31), when the first apparatus is operated, the first communication section transmits an action execution signal indicating an action executed by the first apparatus, to the third communication section (STEP 33), and in a case where the action execution signal transmitted from the first communication section is received by the third communication section after the action instruction signal being transmitted from the third communication section to the second communication section, in a case where the action execution signal indicates that the predetermined action is executed by the first apparatus, the authentication and registration section determines that the predetermined authentication condition of the identification information is satisfied (STEP 34).

According to this authentication and registration system, by the second apparatus being operated, the authentication request signal for requesting authentication of the identification information on the first apparatus is transmitted from the second communication section to the third communication section, and when the authentication request signal is received, the action instruction signal for providing an instruction to execute a predetermined action of the first apparatus is transmitted from the third communication section to the second communication section. Furthermore, when the second communication section receives the action instruction signal, information on the predetermined action is outputted from the information output section, and when the first apparatus is operated, the action execution signal indicating an action executed by the first apparatus is transmitted from the first communication section to the third communication section. Then, when the action execution signal from the first communication section is received by the third communication section after the action instruction signal being transmitted from the third communication section to the second communication section, if the action execution signal indicates that the predetermined action is executed by the first apparatus, the authentication and registration section determines that the predetermined authentication condition of the identification information on the first apparatus is satisfied.

In this case, from the event that after the action instruction signal is transmitted from the third communication section to the second communication section, the action execution signal indicating that the predetermined action is executed by the first apparatus is transmitted from the second communication section to the third communication section, it can be estimated that a person who recognizes the information on the predetermined action outputted from the information output section conveys that information to a person who executes an operation of the first apparatus, or that the person who recognizes the information on the predetermined action is the same person who executes the operation of the first apparatus. From the fact that the information on the predetermined action is conveyed between the two persons, it can be estimated that the two persons are in a relationship of trust. Accordingly, since it is determined whether or not the predetermined authentication condition of the identification information is satisfied through an operation of the first apparatus by the single person or through an operation of the first apparatus by one of the two persons in a relationship of trust, security can be ensured when it is determined whether or not the predetermined authentication condition of the identification information is satisfied. As described above, by merely a single person or one of two persons in a relationship of trust operating the first apparatus, authentication determination can be performed while security is ensured, and a burden can be reduced at the time of authentication and registration of the identification information on the first apparatus.

In the present invention, the first apparatus is preferably at least one of a vehicle 6 and an on-board apparatus (on-board controller 4) mounted on the vehicle, and the second apparatus is preferably a mobile terminal 3.

According to this authentication and registration system, the single user operates at least one of the vehicle and the on-board apparatus, whereby the identification information on the first apparatus can be registered while security is ensured. Thus, a burden at the time of registration can be reduced.

In the present invention, it is preferable that: the vehicle further include a plurality of operation apparatuses (ignition switch 10, wiper switch 11, light switch 12) and a plurality of on-board action apparatuses (starter 20, wiper apparatus 21, headlight 22) which perform actions upon operations of the plurality of operation apparatuses, respectively; the predetermined action include actions of the plurality of on-board action apparatuses (operation sub-commands (1) to (5)) when the plurality of operation apparatuses are operated in a predetermined procedure; and the information output section is a display apparatus (display 3b) of the mobile terminal and information on the predetermined action is displayed on the display apparatus.

According to this authentication and registration system, when the authentication request signal is received from the second communication section of the mobile terminal, the action instruction signal for providing an instruction to perform a predetermined action is transmitted from the third communication section of the authentication and registration apparatus to the second communication section of the mobile terminal and information on the predetermined action in the action instruction signal is displayed on the display apparatus of the mobile terminal. In this case, the predetermined action includes the actions of the plurality of on-board action apparatuses when the plurality of operation apparatuses are operated in the predetermined procedure, enabling enhancement in security when it is determined whether or not the predetermined authentication condition is satisfied, compared to a case where an instruction to cause a single on-board action apparatus to perform an action is provided.

In the present invention, it is preferable that: the first communication section transmit a first identification information signal including the identification information on the first apparatus to the third communication section at a predetermined action timing of the first apparatus and when the first apparatus executes the predetermined action, transmit the action execution signal indicating the action executed by the first apparatus and including the identification information on the first apparatus, to the third communication section (STEP 33); and in a case where the action execution signal is received by the third communication section in a state in which the first identification information signal is received, in a case where the action execution signal indicates that the predetermined action is executed by the first apparatus and the identification information included in the action execution signal and the identification information included in the first identification information signal match each other, the authentication and registration section determine that the predetermined authentication condition of the identification information is satisfied (STEP 55).

According to this authentication and registration system, in the first apparatus, the first identification information signal including the identification information on the first apparatus to the third communication section at a predetermined action timing of the first apparatus, and when the first apparatus executes the predetermined action, the action execution signal indicating the action executed by the first apparatus and including the identification information on the first apparatus is transmitted to the third communication section. Furthermore, in the authentication and registration section, when the action execution signal is received by the third communication section in a state in which the first identification information signal is received, if the action execution signal indicates that the predetermined action is executed by the first apparatus and the identification information included in the action execution signal and the identification information included in the first identification information signal match each other, it is determined that the predetermined authentication condition of the identification information is satisfied. As described above, the identification information match determination is performed in addition to the predetermined action execution determination, enabling further enhancement in security when it is determined whether or not the predetermined authentication condition is satisfied.

BRIEF DESCRIPTION OF THE DRAWINGS

FIG. 4 is a block diagram showing a configuration of a vehicle including an on-board controller and the like;

DETAILED DESCRIPTION OF THE PREFERRED EMBODIMENTS

Hereinafter, an authentication and registration system according to an embodiment of the present invention will be described with reference to drawings. The authentication and registration system according to the present embodiment is aimed for use in telematics and to enable a user to register identification information related to a vehicle owned by the user.

Figure 1:
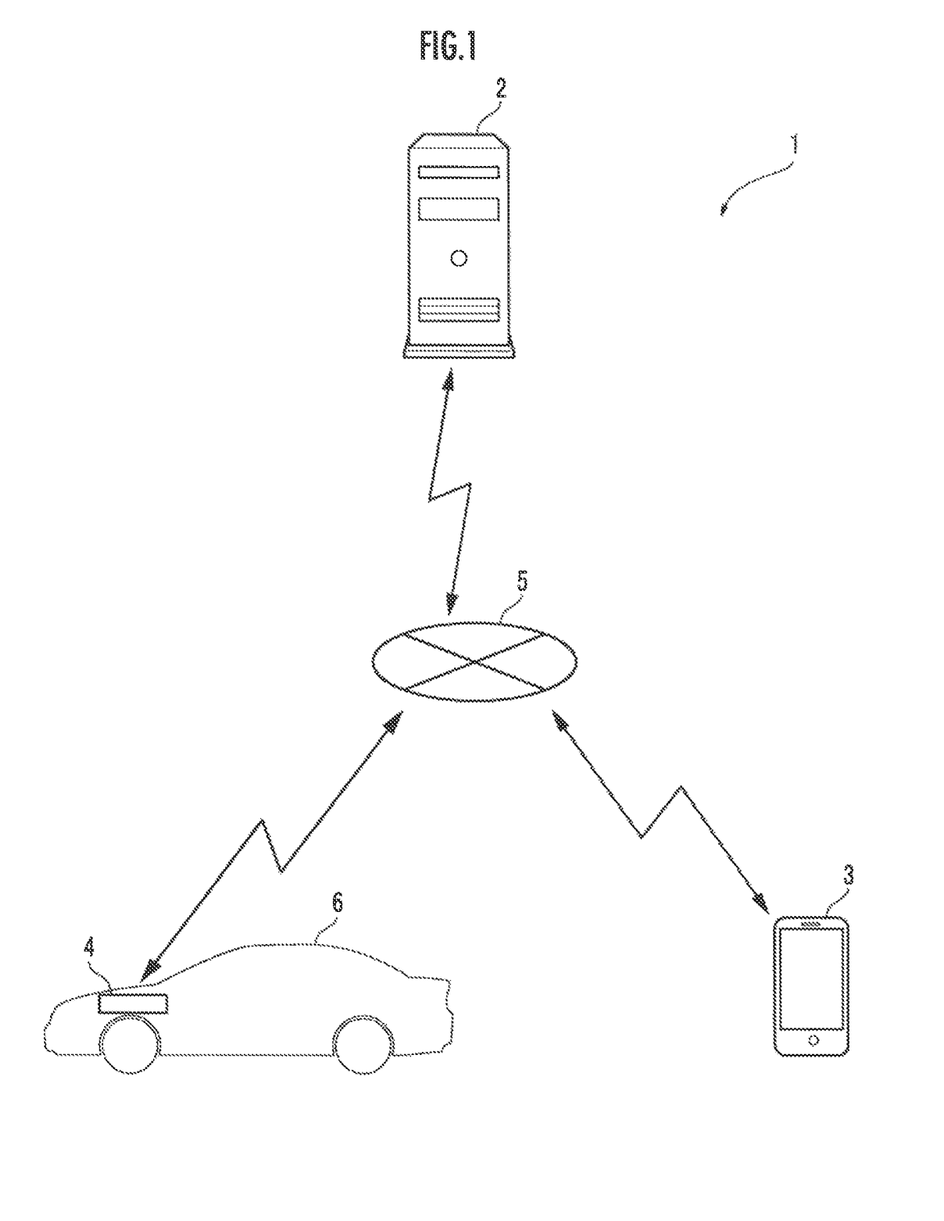
FIG. 1 shows a configuration of an authentication and registration system according to an embodiment of the present invention.

As shown in FIG. 1, an authentication and registration system 1 according to the present embodiment includes a registration server 2, a plurality of mobile terminals 3 (only one is shown), a plurality of on-board controllers 4 (only one is shown), and the like. These components 2 to 4 are connected via a wireless communication network 5 (network) so that the components 2 to 4 can perform data communication.

Figure 2:
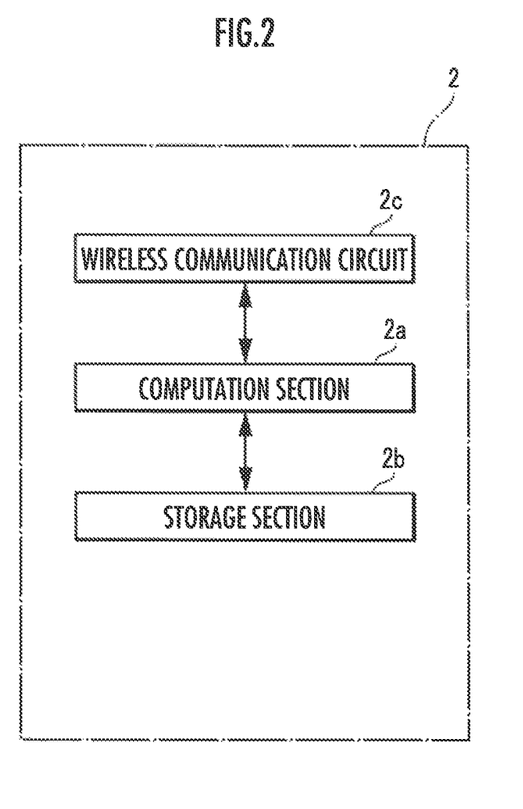
FIG. 2 is a block diagram showing a configuration of a registration server.

As shown in FIG. 2, the registration server 2 includes a computation section 2a, a storage section 2b, a wireless communication circuit 2c, and the like. Note that in the present embodiment, the registration server 2 corresponds to an authentication and registration apparatus, the computation section 2a and the storage section 2b correspond to an authentication and registration section, and the wireless communication circuit 2c corresponds to a third communication section.

The registration server 2 performs data communication with the mobile terminal 3 and the on-board controller 4 via the wireless communication circuit 2c and the wireless communication network 5. Through the data communication, authentication processing for authenticating various types of identification information, which will be described later, is performed, and when authentication succeeds, the various types of identification information are registered into the storage section 2b.

When the various types of identification information are thus registered into the storage section 2b of the registration server 2, telematics are available to a user thereafter. That is, the user can remotely operate the registered vehicle, such as starting an engine, by operating the mobile terminal 3.

Figure 3:
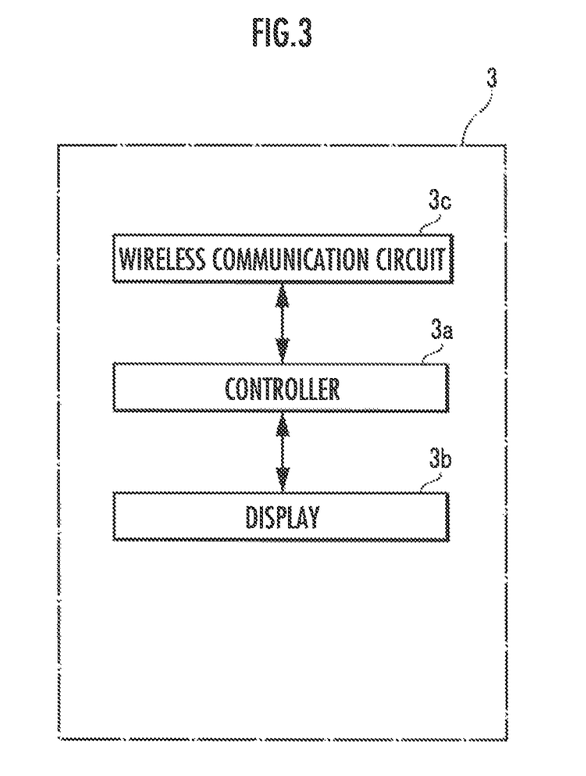
FIG. 3 is a block diagram showing a configuration of a mobile terminal.

The mobile terminal 3 is of a smartphone type and includes a controller 3a, a display 3b, a wireless communication circuit 3c, and the like as shown in FIG. 3. Note that in the present embodiment, the mobile terminal 3 corresponds to a second apparatus, the display 3b corresponds to an information output section and a display apparatus, and the wireless communication circuit 3c corresponds to a second communication section.

The controller 3a is configured with a microcomputer including a processor, a memory, and an I/O interface.

The display 3b is configured with a capacitive touch panel and is disposed across an almost entire front face of the mobile terminal 3. When an input operation (for example, tapping, swiping, pinching-out, or pinching-in) is executed by the user on the display 3b, an operation signal indicating the operation is outputted to the controller 3a.

Further, the wireless communication circuit 3c is configured to be able to transmit a radio signal to and receive a radio signal from the wireless communication network 5. The controller 3a performs data communication with the registration server 2 via the wireless communication circuit 3c and the wireless communication network 5.

When application software for a predetermined communication service (hereinafter, referred to as the "communication software") is installed by the user into the mobile terminal 3, the mobile terminal 3 becomes able to perform data communication with the registration server 2 through the communication software, which will be described later. Thus, transmission of an authentication and registration request signal and the like, which will be described later, can be performed through an input operation on the display 3b by the user. Note that in a description below, it is assumed that the communication software is already installed in the mobile terminal 3.

Figure 4:
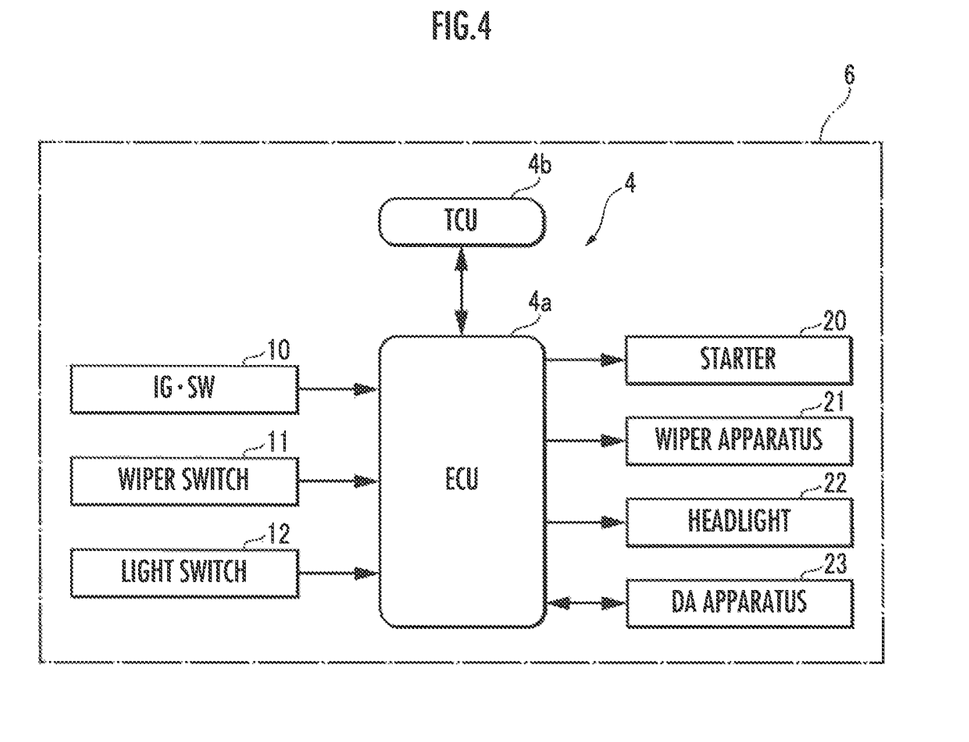

On the other hand, the on-board controller 4 is mounted on a vehicle 6. The vehicle 6 includes a gasoline engine (not shown) as a power source. As shown in FIG. 4, the on-board controller 4 includes an ECU 4a and a TCU 4b. Note that in the present embodiment, the on-board controller 4 corresponds to a first apparatus and an on-board apparatus, the TCU 4b corresponds to a first communication section, and the vehicle 6 corresponds to the first apparatus.

The ECU 4a is configured to perform various types of control processing for the vehicle 6 and configured with a microcomputer including a processor (not shown), a storage (not shown), a memory (not shown), an I/O interface (not shown), and the like.

In the memory of the ECU 4a, vehicle identification information VIN and user identification information POID are stored. The vehicle identification information VIN is identification information on the vehicle 6 and is assigned when the vehicle 6 is manufactured. The user identification information POID is identification information on an owner of the vehicle 6 and is assigned when the vehicle 6 is sold or the like. When the owner of the vehicle 6 is changed, new user identification information POID is assigned. The ECU 4a performs various types of control processing based on operation programs in the memory and inputted and outputted data, which will be described later.

Further, the ECU 4a is electrically connected to the TCU 4b and is configured to be able to perform data communication with the TCU 4b. The TCU 4b includes a processor (not shown), a storage (not shown), a memory (not shown), an I/O interface (not shown), a wireless communication circuit (not shown), and the like.

The wireless communication circuit of the TCU 4b incorporates a SIM card (not shown). The SIM card is under a contract with a carrier, whereby the wireless communication circuit of the TCU 4b is configured to be able to perform data communication with the registration server 2 via the SIM card and the wireless communication network 5.

SIM card identification information (hereinafter, referred to as the "SIM identification information") IMSI is associated with the SIM card. With the configuration as described above, the on-board controller 4 performs data communication with the registration server 2 via the TCU 4b and the wireless communication network 5, which will be described later.

Further, an ignition switch (hereinafter, referred to as the "IG SW") 10, a wiper switch 11, a light switch 12, a starter 20, a wiper apparatus 21, a headlight 22, and a DA apparatus 23 are electrically connected to the ECU 4a. Each of the switches 10 to 12 is disposed in vicinity of a steering wheel (not shown) of the vehicle 6 and, when operated by a driver to be turned on or off, outputs an operation signal indicating the operation to the ECU 4a.

The starter 20 is configured to start the engine of the vehicle 6 and is disposed in vicinity of the engine of the vehicle 6. When the IG SW 10 is operated to be turned on by the driver of the vehicle 6 through an ignition key, an operation signal indicating the operation is outputted from the IG SW 10 to the ECU 4*a*. Thus, the ECU 4*a* drives the starter 20 to start the engine.

The wiper apparatus 21 is configured to wipe water droplets and dust on a front window of the vehicle 6 and is disposed in vicinity of a lower-end portion of the front window. When the wiper switch 11 is operated to be turned on by the driver of the vehicle 6, an operation signal indicating the operation is outputted from the wiper switch 11 to the ECU 4*a*. Thus, the ECU 4*a* causes the wiper apparatus 21 to perform an on action.

Further, the headlight 22 is configured to illuminate a front of the vehicle 6 and is disposed at a front-end portion of the vehicle 6. When the light switch 12 is operated to be turned on by the driver of the vehicle 6, an operation signal indicating the operation is outputted from the light switch 12 to the ECU 4*a*. Thus, the ECU 4*a* turns on the headlight 22.

On the other hand, the DA apparatus 23 is configured to provide image information such as navigation information and music information to the driver and is disposed on a front side of a vehicle interior. The DA apparatus 23 includes a display (not shown), a music operation section (not shown), and the like. When the DA apparatus 23 is in action, the navigation information or the like is displayed on the display.

Figure 5:
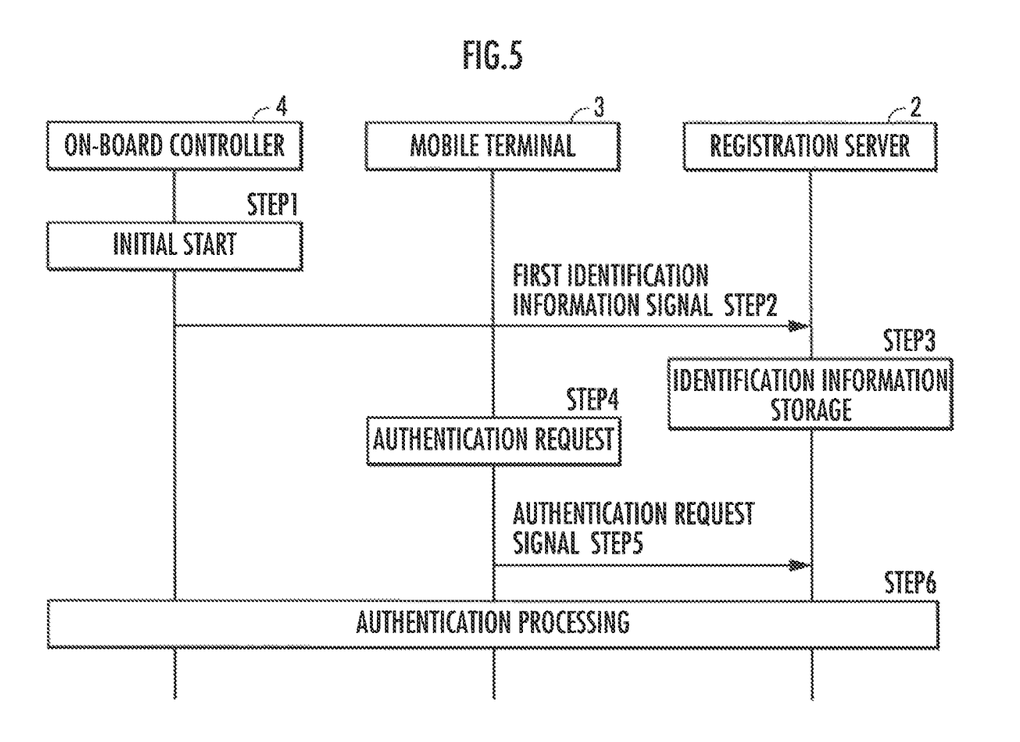
FIG. 5 shows communication operation at the time of authentication and registration performed by the authentication and registration system.

Next, a description will be given of communication operation at the time of authentication and registration performed by the authentication and registration system 1 according to the present embodiment, with reference to FIG. 5. As shown in FIG. 5, first, initial start processing is performed at the on-board controller 4 (FIG. 5, STEP 1).

The initial start processing is performed when a user starts the engine for a first time after purchase of the vehicle 6. More specifically, when the ignition key is turned to an on position by the user and the IG SW 10 is turned on, a command to output a first identification information signal is transmitted from the ECU 4*a* to the TCU 4*b*.

Thus, the first identification information signal is transmitted by the TCU 4*b* to the registration server 2 (FIG. 5, STEP 2). The first identification information signal includes the above-described vehicle identification information VIN, user identification information POID, and SIM identification information IMSI as data.

Subsequently, identification information storage processing is performed at the registration server 2 (FIG. 5, STEP 3). In this processing, the three types of identification information VIN, POID, and IMSI included in first identification information signal are stored into the storage section 2*b* of the registration server 2.

Thereafter, authentication request processing is performed at the mobile terminal 3 (FIG. 5, STEP 4). In the authentication request processing, when the vehicle identification information VIN is inputted into an entry field (not shown) of the above-described communication software through an operation on the display 3*b* by the user while the communication software is running, it is determined to transmit an authentication request signal to the registration server 2.

By the authentication request processing being performed, the authentication request signal is transmitted from the mobile terminal 3 to the registration server 2 (FIG. 5, STEP 5). The authentication request signal includes the vehicle identification information VIN as data.

When the authentication request signal is received by the registration server 2, subsequently, authentication processing is performed (FIG. 5/STEP 7). More specifically, the authentication processing is performed in such a manner as shown in FIG. 6.

Figure 6:
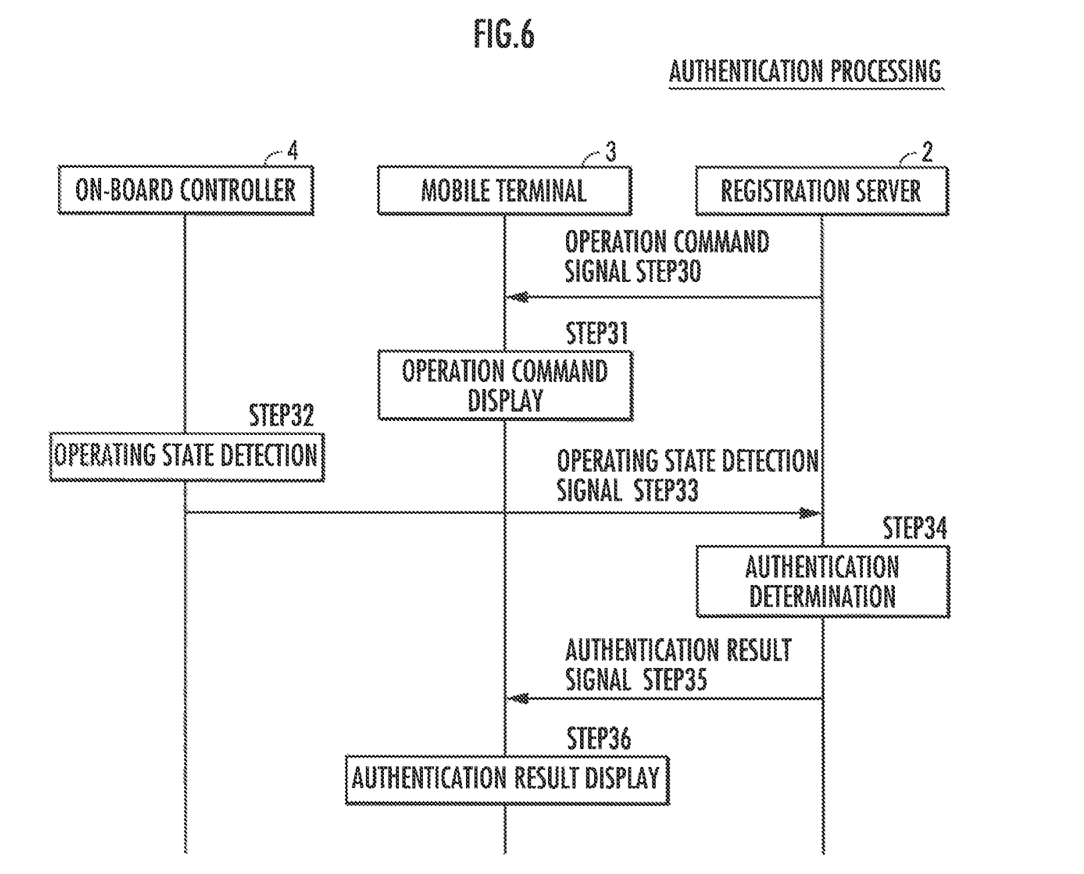
FIG. 6 shows communication operation in authentication processing.

As shown in FIG. 6, first, an operation command signal is transmitted from the registration server 2 to the mobile terminal 3 (FIG. 6, STEP 30). The operation command signal includes an operation command as described below as data. In this case, the operation command signal corresponds to an action instruction signal.

At the mobile terminal 3, when the operation command signal is received, the operation command included in the operation command signal is displayed on the display 3*b* (FIG. 6, STEP 31). The operation command includes five operation sub-commands (1) to (5) as follows.

(1) Start the engine.
(2) After the engine is started, move the wipers for ten seconds.
(3) After the wipers are moved for ten seconds, stop the wipers.
(4) After the wipers are stopped, turn on the light for ten seconds.
(5) After the light is turned on for ten seconds, turn off the light.

On the other hand, at the on-board controller 4, operating state detection processing is performed by the ECU 4*a* (FIG. 6, STEP 32). The operating state detection processing is to detect operating states of the above-described apparatuses 20 to 23 of the vehicle 6, based on the above-described operation signals from the switches 10 to 12 and detection signals from various sensors (not shown), and is performed at a predetermined control cycle.

More specifically, start of the engine is detected based on the operation signal from the IG SW 10 and a detection signal from a crank angle sensor (not shown). An on/off action state of the wiper apparatus 21 is detected based on the operation signal from the wiper switch 11. A lit/unlit state of the headlight 22 is detected based on the operation signal from the light switch 12.

The operation state detection processing is performed as described above, whereby an operating state detection signal is outputted from the on-board controller 4 to the registration server 2 at the predetermined control cycle (FIG. 6, STEP 33). The operating state detection signal is outputted as a signal associated with the vehicle identification information VIN.

At the registration server 2, authentication determination processing is performed at the predetermined control cycle based on the operating state detection signal (FIG. 6, STEP 34).

Figure 7:
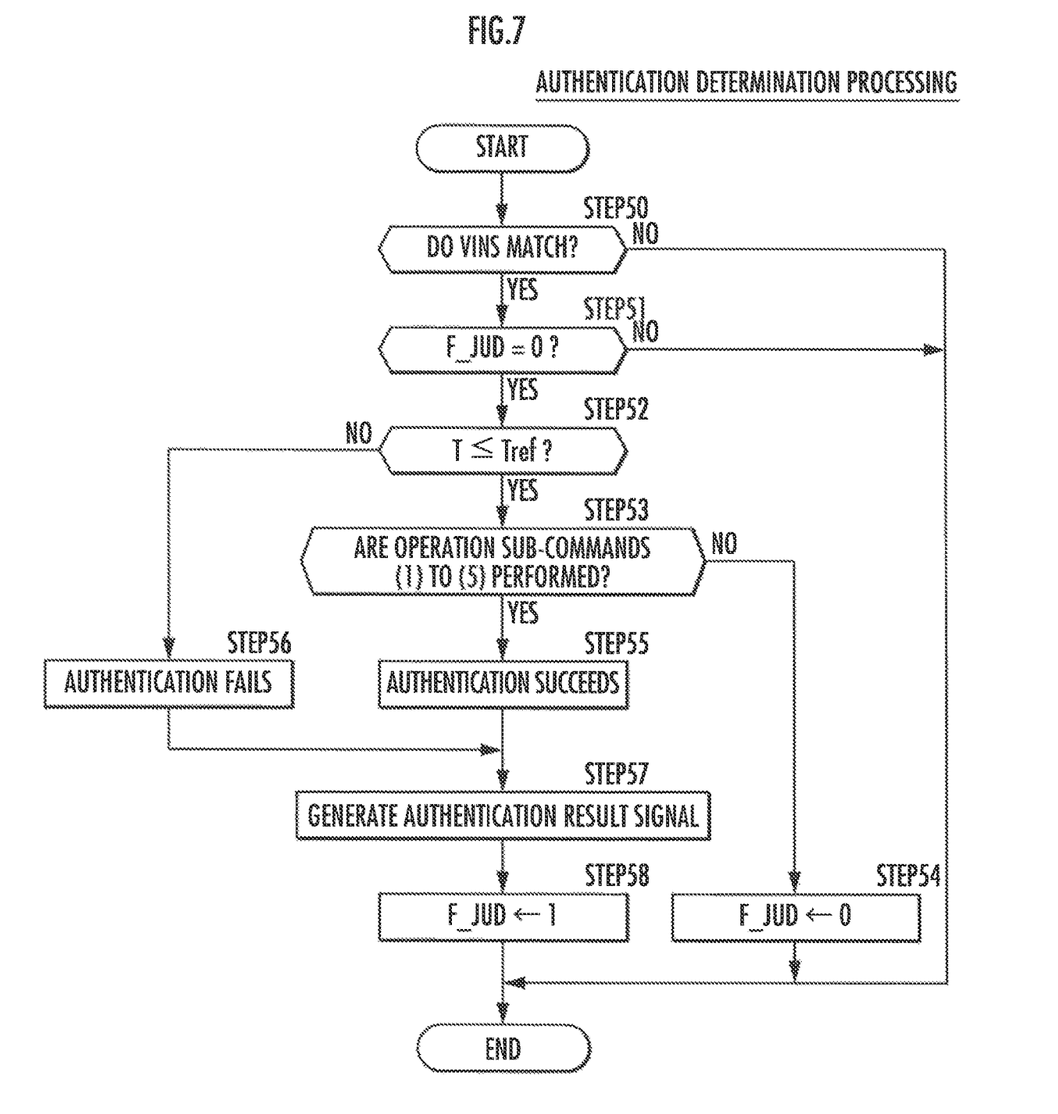
FIG. 7 is a flowchart showing details of authentication determination processing.

The authentication determination processing is to determine whether or not authentication succeeds, based on the operating state detection signal, and more specifically, is performed as shown in FIG. 7.

As shown in FIG. 7, first, it is determined whether or not the vehicle identification information VIN included in the above-mentioned authentication request signal matches the vehicle identification information VIN included in the operating state detection signal (FIG. 7, STEP 50).

When this determination gives a negative result, (FIG. 7, STEP 50 . . . NO), this processing is immediately terminated. When this determination gives a positive result (FIG. 7, STEP 50 . . . YES), that is, when the vehicle identification information VIN included in the above-mentioned authentication request signal matches the vehicle identification information VIN included in the operating state detection signal, it is determined whether or not an authentication judgement flag F_JUD indicates "0" (FIG. 7, STEP 51).

When this determination gives a negative result (FIG. 7, STEP 51 . . . NO), that is, when F_JUD=1 and success or failure of authentication of the identification information is therefore already determined, this processing is immediately terminated.

When this determination gives a positive result (FIG. 7, STEP 51 . . . YES), it is determined whether or not a passed time period T is a predetermined time period Tref or less (FIG. 7, STEP 52). The passed time period T is obtained by measuring time passed since the above-described operation command signal is outputted from the registration server 2 to the mobile terminal 3. The predetermined time period Tref is set at an appropriate predetermined value (for example, five minutes).

When this determination gives a positive result (FIG. 7, STEP 52 . . . YES), it is determined whether or not all of the above-described operation sub-commands (1) to (5) are performed in consecutive order (FIG. 7, STEP 53). When this determination gives a negative result (FIG. 7, STEP 53 . . . NO), since the result indicates that success or failure of authentication has not been determined, the authentication judgement flag F_JUD is set to "0" (FIG. 7, STEP 54). Thereafter, this processing is terminated.

When the above-described determination gives a positive result (FIG. 7, STEP 53 . . . YES), that is, when all of the above-described operation sub-commands (1) to (5) are performed in consecutive order (when a predetermined authentication condition of the identification information is satisfied), it is determined that authentication of the identification information succeeds (FIG. 7, STEP 55). Thus, the three types of identification information VIN, POID, and IMSI are registered into the storage section 2b of the registration server 2.

When the above-mentioned passed time period T exceeds the predetermined time period Tref (FIG. 7, STEP 52 . . . NO), it is determined that authentication of the identification information fails (FIG. 7, STEP 56). In this case, the above-described three types of identification information VIN, POID, and IMSI are not registered into the storage section 2b of the registration server 2.

After success or failure of authentication of the identification information is determined as described above, an authentication result signal is generated as a signal including a determination result (success or failure) of authentication of the identification information as data (FIG. 7, STEP 57).

Subsequently, to indicate that success or failure of authentication of the identification information is already determined, the authentication judgement flag F_JUD is set to "1" (FIG. 7, STEP 58). Thereafter, this processing is terminated.

Referring back to FIG. 6, the registration server 2, after performing the authentication determination processing as described above, transmits the authentication result signal to the mobile terminal 3 (FIG. 6, STEP 35).

At the mobile terminal 3, when the authentication result signal is received by the mobile terminal 3, the determination result, success or failure, of authentication of the identification information is displayed on the display 3b (FIG. 7, STEP 36). Thus, the user can visually recognize whether or not telematics becomes available. The second authentication processing is performed as described above.

As described above, according to the authentication and registration system 1 of the present embodiment the registration server 2 transmits the operation command signal including the operation sub-commands (1) to (5) over the vehicle 6 to the mobile terminal 3 when the authentication request signal is received from the mobile terminal 3 (STEP 30). Further, when the operation command signal is received, the mobile terminal 3 displays the operation sub-commands (1) to (5) on the display 3b (STEP 31). Then, when the operation sub-commands (1) to (5) are performed by the switches 10 to 12 of the vehicle 6 being operated, the operating state signal indicating that fact is transmitted to the registration server 2 (STEP 33). At the registration server 2, when the operating state signal indicating that all of the operation sub-commands (1) to (5) are performed in consecutive order is received, it is determined that the authentication condition of the identification information is satisfied (STEP 34).

In this case, from the event that the operation sub-commands (1) to (5) are performed after the operation command signal is transmitted from the registration server 2 to the mobile terminal 3 and the operation command is displayed on the display 3b, it can be estimated that a person who recognizes the operation command on the display 3b conveys that information to, or is the same person as, a person who performs the operation sub-commands (1) to (5). Moreover, from the fact that the information on the operation sub-commands (1) to (5) is conveyed between the two persons, it can be estimated that the two persons are in a relationship of trust.

Accordingly, since it is determined whether or not the identification information can be authenticated through operations of the switches of the vehicle 6 by the single person, or through operations of the switches of the vehicle 6 by one of the two persons in relationship of trust, security can be ensured when it is determined whether or not the identification information can be authenticated. As described above, authentication determination can be performed while security is ensured, and a burden can be reduced at the time of authentication and registration of the identification information related to the vehicle 6.

Note that although the embodiment shows an example where the vehicle 6 and the on-board controller 4 are used for the first apparatus, the first apparatus of the present invention is not limited to this example. The first apparatus may be any apparatus or the like which includes the first communication section configured to transmit and receive a data signal, with which identification information is associated, and which can perform an action through an operation by a first user. For example, one of the vehicle 6 and the on-board controller 4 may be used for the first apparatus, or other industrial machines such as a ship, an electric train, and a robot may be used for the first apparatus.

Although the embodiment shows an example where the on-board controller 4 is used for the on-board apparatus, the on-board apparatus of the present invention is not limited to this example. The on-board apparatus may be any apparatus or the like which is mounted on a vehicle. For example, a car navigation system and the like may be used for the on-board apparatus.

Although the embodiment shows an example where the mobile terminal 3 is used for the second apparatus, the second apparatus of the present invention is not limited to this example. The second apparatus may be any apparatus or the like which includes the second communication section configured to transmit and receive a data signal, is provided separately from the first apparatus and can be operated in parallel with the first apparatus, and can perform an action through an operation by a second user. For example, other industrial machines such as a notebook computer and a tablet PC may be used for the second apparatus. Note that in the present invention, the first user and the second user may be the same person, or may be two different persons.

Although the embodiment shows an example where the registration server 2 is used for the authentication and registration apparatus, the authentication and registration apparatus of the present invention is not limited to this example. The authentication and registration apparatus may be any apparatus or the like which includes the third communication section configured to be able to perform data communication with the first communication section and with the second communication section via the network, and the authentication and registration section configured to register the identification information when the first identification information signal including the identification information associated with the first apparatus is already received from the first communication section by third communication section and when the predetermined authentication condition of the identification information is satisfied. For example, a personal computer and the like may be used for the authentication and registration apparatus.

Although the embodiment shows an example where the vehicle identification information VIN is used for the identification information, the identification information of the present invention is not limited to this example. Any identification information which is associated with at least one of the vehicle and the on-board apparatus may be used. For example, both the vehicle identification information VIN and the SIM identification information IMSI may be used for the identification information or only the SIM identification information IMSI may be used for the identification information.

In that case, when the two types of identification information VIN and IMSI are used for the identification information, the two types of identification information VIN and IMSI are transmitted as the authentication request signal to the registration server 2, the operating state detection signal is configured so as to include the two types of identification information VIN and IMSI, and in STEP 50 in the authentication determination processing, it is determined whether or not the identification information VIN and IMSI in the first identification information signal and the identification information VIN and IMSI in the operating state detection signal match each other.

Also, when the SIM identification information IMSI is used for the identification information, the SIM identification information IMSI is transmitted as the authentication request signal to the registration server 2, and the operating state detection signal is configured so as to include the SIM identification information IMSI, and in STEP 50 in the authentication determination processing, it is determined whether or not the SIM identification information IMSI in the first identification information signal and the SIM identification information IMSI in the operating state detection signal match each other.

Furthermore, the embodiment shows an example where the display 3b is used as an information output section. However, the information output section of the present invention is not limited to this example and may be any apparatus or the like which outputs information included in the data signal received by the second communication section. For example, an audio output apparatus which outputs audio information included in the data signal received by the second communication section may be used for the information output section.

Also, the embodiment shows an example where the display 3b is used as the display apparatus. However, the display apparatus of the present invention is not limited to this example and may be any apparatus or the like which displays information included in the data signal received by the second communication section. For example, a personal computer display may be used as the display apparatus.

Although the embodiment shows an example where three switches 10 to 12 are used as the operation apparatuses, the operation apparatuses of the present invention are not limited to this example and may any apparatuses or the like which each cause the corresponding on-board action apparatus to execute an action upon an operation of the operation apparatus. For example, a horn switch, a direction indicator switch and the like may be used for the operation apparatuses.

Although the embodiment shows an example where the three apparatuses 20 to 22 are used as the on-board action apparatuses, the on-board action apparatuses of the present invention are not limited to this example and may be any apparatuses or the like which each perform an action upon an operation of the corresponding operation apparatus. For example, a horn apparatus, a direction indicator apparatus and the like may be used for the on-board action apparatuses.

Although the embodiment shows an example where the operation sub-commands (1) to (5) are used as the actions of the plurality of on-board action apparatuses, the actions of the plurality of the on-board action apparatuses of the present invention are not limited to this example and may be any actions or the like performed by the plurality of on-board action apparatuses. For example, where the horn apparatus and the direction indicator apparatus are used as the plurality of on-board action apparatuses, a sound producing action of the horn apparatus and a direction indicating action of the direction indicator apparatus may be used.

Note that in the authentication determination processing in FIG. 7, the vehicle identification information VIN match determination (STEP 50) may be omitted.

What is claimed is:

1. An authentication and registration system comprising:
a first apparatus which includes a first communication section configured to transmit and receive a data signal, with which identification information is associated, and which performs an action through an operation by a first user;
a second apparatus which includes a second communication section configured to transmit and receive a data signal and an information output section configured to output information included in the data signal received by the second communication section, is provided separately from the first apparatus and is operable in parallel with the first apparatus, and performs an action through an operation by a second user; and
an authentication and registration apparatus which includes a third communication section configured to be able to perform data communication with the first communication section and with the second communication section via a network, and an authentication and registration section configured to register the identification information when a predetermined authentication condition of the identification information on the first apparatus is satisfied,
wherein by the second apparatus being operated, the second communication section transmits an authentication request signal for requesting authentication of the identification information on the first apparatus to the third communication section,
when the third communication section receives the authentication request signal from the second communication section, the third communication section transmits, to the second communication section, an action instruction signal for providing an instruction to execute a predetermined action of the first apparatus, the information output section outputs information on the predetermined action when the second communication section receives the action instruction signal, when the first apparatus is operated, the first communication section transmits an action execution signal indicating the predetermined action executed by the first apparatus, to the third communication section, the first communication section transmits a first identification information signal including the identification information on the first apparatus to the third communication section at a predetermined action timing of the first apparatus and when the first apparatus executes the predetermined action, transmits the action execution signal indicating the predetermined action executed by the first apparatus and including the identification information on the first apparatus, to the third communication section, and in a case where the action execution signal transmitted from the first communication section is received by the third communication section after the action instruction signal being transmitted from the third communication section to the second communication section, in a case where the action execution signal indicates that the predetermined action is executed by the first apparatus, the authentication and registration section determines that the predetermined authentication condition of the identification information is satisfied, in a case where the action execution signal is received by the third communication section in a state in which the first identification information signal is received, in a case where the action execution signal indicates that the predetermined action is executed by the first apparatus and the identification information included in the action execution signal and the identification information included in the first identification information signal match each other, the authentication and registration section determines that the predetermined authentication condition of the identification information is satisfied, and the first communication section is a telematics control unit, the second communication section and the third communication section are each wireless communication circuits, the information output section is one of a display and an audio output apparatus, and the authentication and registration section is a processor and memory.

2. The authentication and registration system according to claim 1, wherein the first apparatus is at least one of a vehicle and an on-board apparatus mounted on the vehicle, and the second apparatus is a mobile terminal.

3. The authentication and registration system according to claim 2, wherein the vehicle further includes a plurality of operation apparatuses and a plurality of on-board action apparatuses which perform actions upon operations of the plurality of operation apparatuses, respectively, the predetermined action includes actions of the plurality of on-board action apparatuses when the plurality of operation apparatuses are operated in a predetermined procedure, and the information output section is a display apparatus of the mobile terminal and information on the predetermined action is displayed on the display apparatus.

* * * * *